United States Patent [19]

Weiss et al.

[11] Patent Number: 5,741,071
[45] Date of Patent: Apr. 21, 1998

[54] RADIOMETER FOR THE DETERMINATION OF A TEMPERATURE OF A BODY BY MEASURING EMITTED THERMAL NOISE

[75] Inventors: Michel Weiss, Gries; Laurent Martinache, Haguenau; Olivier Gonella, Wissembourg, all of France

[73] Assignee: Sadis Bruker Spectrospin Societe Anonyme de Diffusion de l'Instrumentation Scientifique Bruker Spectrospin, Wissembourg, France

[21] Appl. No.: 517,415

[22] Filed: Aug. 21, 1995

[30] Foreign Application Priority Data

Aug. 19, 1994 [FR] France .................. 94 10235

[51] Int. Cl.⁶ .................................................. G01K 7/30
[52] U.S. Cl. ................................................... 374/175
[58] Field of Search ................................ 374/175, 163

[56] References Cited

U.S. PATENT DOCUMENTS 3,818,761 6/1974 Brixy et al. ........................ 374/175

| | | | |
|---|---|---|---|
| 3,878,723 | 4/1975 | Blalock et al. | 374/175 |
| 3,890,841 | 6/1975 | Brixy | 374/175 |
| 4,099,413 | 7/1978 | Ohte et al. | 374/175 |

FOREIGN PATENT DOCUMENTS

| | | | |
|---|---|---|---|
| 0149414 | 7/1981 | Germany | 374/175 |
| 0488094 | 10/1975 | U.S.S.R. | 374/175 |
| 0708177 | 1/1980 | U.S.S.R. | 374/175 |

*Primary Examiner*—Diego F. F. Gutierrez
*Attorney, Agent, or Firm*—Young & Thompson

[57] ABSTRACT

Radiometer for the determination of a temperature of a body by measuring emitted thermal noise and measurement process using this radiometer. The radiometer includes a double radiofrequency signal amplification chain (1) for thermal noises, one of whose branches (2') continuously measures a thermal noise signal generated by a predetermined reference source (3), two converter circuits (5, 5', 6, 6') whose continuous signals are transmitted to a unit (8) for control, processing and evaluation, and means (9, 10, 11) for changing the heterodyne frequency transposition of the radiofrequency signal frequencies of the thermal noise processed in the two branches (2 and 2').

14 Claims, 2 Drawing Sheets

RADIOMETER FOR THE DETERMINATION OF A TEMPERATURE OF A BODY BY MEASURING EMITTED THERMAL NOISE

BACKGROUND OF THE INVENTION

The present invention relates to the field of the quantitative evaluation of energy or of power conveyed and imposed by radiofrequency radiations, particularly for the regulation and control of a process for treatment using heating by radiofrequency radiation, in particular microwaves, and has for its object a radiometer adapted to measure the thermal noise emitted by a body or a portion of a body so as to determine the mean temperature thereof, in a precise and continuous manner.

There already exist different types of radiometers based on the principle of the evaluation of the energy of the thermal noise emitted by a body to determine the temperature thereof.

This evaluation is always effected, in these known radiometers, by comparing the energy of the signal of thermal noise detected by an antenna disposed on or in the body whose temperature must be determined, with the energy of one or several signals of thermal noise delivered by at least one reference source, whose temperature or temperatures is or are known, as well as the energy of the signal reflected by a radiofrequency short circuits if desired.

However, the determination and evaluation of the different mentioned signals is done in an alternating and cyclical manner, which does not permit indicating in a continuous manner the instantaneous temperature of the body in question. Thus, these existing radiometers permit only displaying, with cooling, of the value at regular intervals of generally more than 5 seconds, a value of the temperature offset in time, which does not correspond to the actual value of the temperature at the moment of display, but at that which was taken several seconds previously.

These radiometers therefore do not permit precisely following in real time the temperature, as is necessary for example for the regulation of a process for treatment by hyperthermia or microwave thermotherapy and in which the occurrence of abnormal heating or the exceeding of a threshold value must be noted as quickly as possible, which is rendered relatively delicate because of the high thermal loss and dissipation of living tissue.

Moreover, these existing radiometers do not take into account as desired ranges of frequencies polluted by parasitic emissions (radars, microwave ovens, radiotelephones) which interfere or superpose themselves on the thermal noise signals to be measured and as a result render false the measurements of temperature based on the evaluation of the energy or the power of the signals detected by the measuring antenna.

Moreover, these existing radiometers require long and fastidious calibration phases, which it is often necessary to repeat several times for a single set of measurements.

SUMMARY OF THE INVENTION

The present invention has particularly for its object to overcome all of the recited drawbacks.

To this end, it has for its object a radiometer adapted to measure the thermal noise so as to determine the mean temperature of a body or of a portion of a body by means of a corresponding measuring antenna, characterized in that it is essentially constituted, on the one hand, by a double chain of amplification of radiofrequency signals of thermal noises, whose two independent branches are structurally symmetrical, one of said branches measuring continuously a thermal noise signal generated by a predetermined reference source, on the other hand, by two assemblies of identical converter circuits disposed each respectively in one of the two branches of the double radiofrequency amplification chain and each delivering a continuous signal whose value is proportional to the value of the power of the thermal noise signal issuing from the associated branch, said continuous signals being transmitted, directly or after integration by a continuous differential amplification, to a unit for control, processing and evaluation and, finally, by means for changing heterodyne frequency transporting in a window of lower frequencies the frequencies of the radiofrequency signals of thermal noise processed in the two branches of the double chain of radiofrequency amplification, the characteristics of said transposition window of frequencies being determined by the unit for control, processing and evaluation, as a function particularly of any external interference signals.

The invention also has for its object a process for measuring temperature using the mentioned radiometer and consisting, in a measuring phase, in taking account simultaneously and continuously of the thermal noise signals delivered on the one hand by a radiometric antenna applied on the body or a portion of the body, particularly human, and, on the other hand, by a defined reference source, then in amplifying and transposing in the frequency field said mentioned two thermal noise signals, this by means of two treatment paths or independent and identical branches of a double radiofrequency amplification chain, in then extracting separately the continuous signals corresponding to the powers of each of said two mentioned thermal noise signals, and, finally, in comparing the two continuous signals, analogically or digitally, to determine in real time the absolute value of the temperature of the body or of the portion of the body in question, by integrating different correction factors.

BRIEF DESCRIPTION OF THE DRAWINGS

The invention will be better understood from the following description, which relates to preferred embodiments, given by way of non-limiting examples, and explained with reference to the accompanying schematic drawings, in which.

DESCRIPTION OF THE PREFERRED EMBODIMENTS

Figure 1:
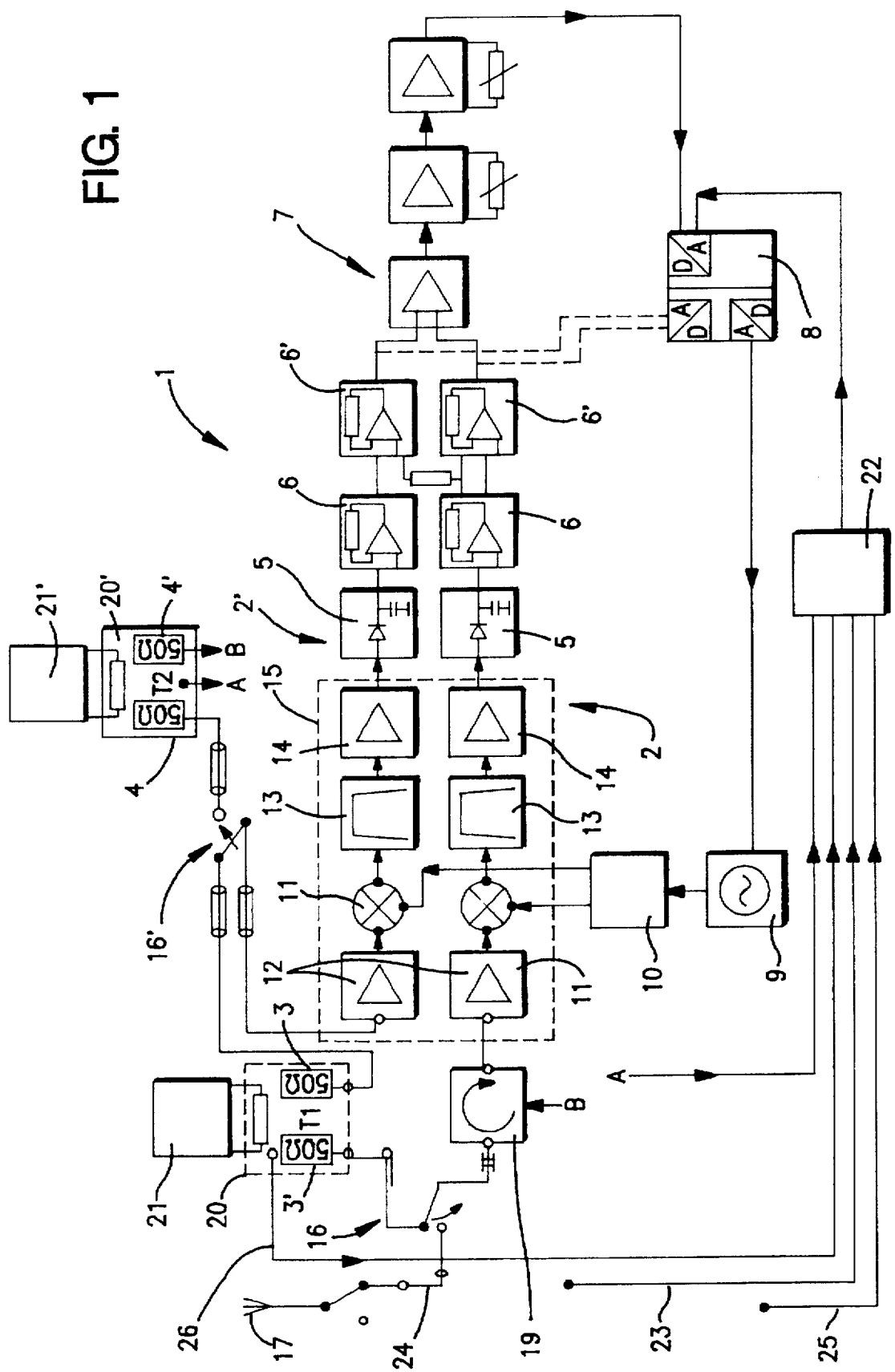
FIG. 1 is a synoptic diagram of a radiometer according to the invention.
Figure 2:
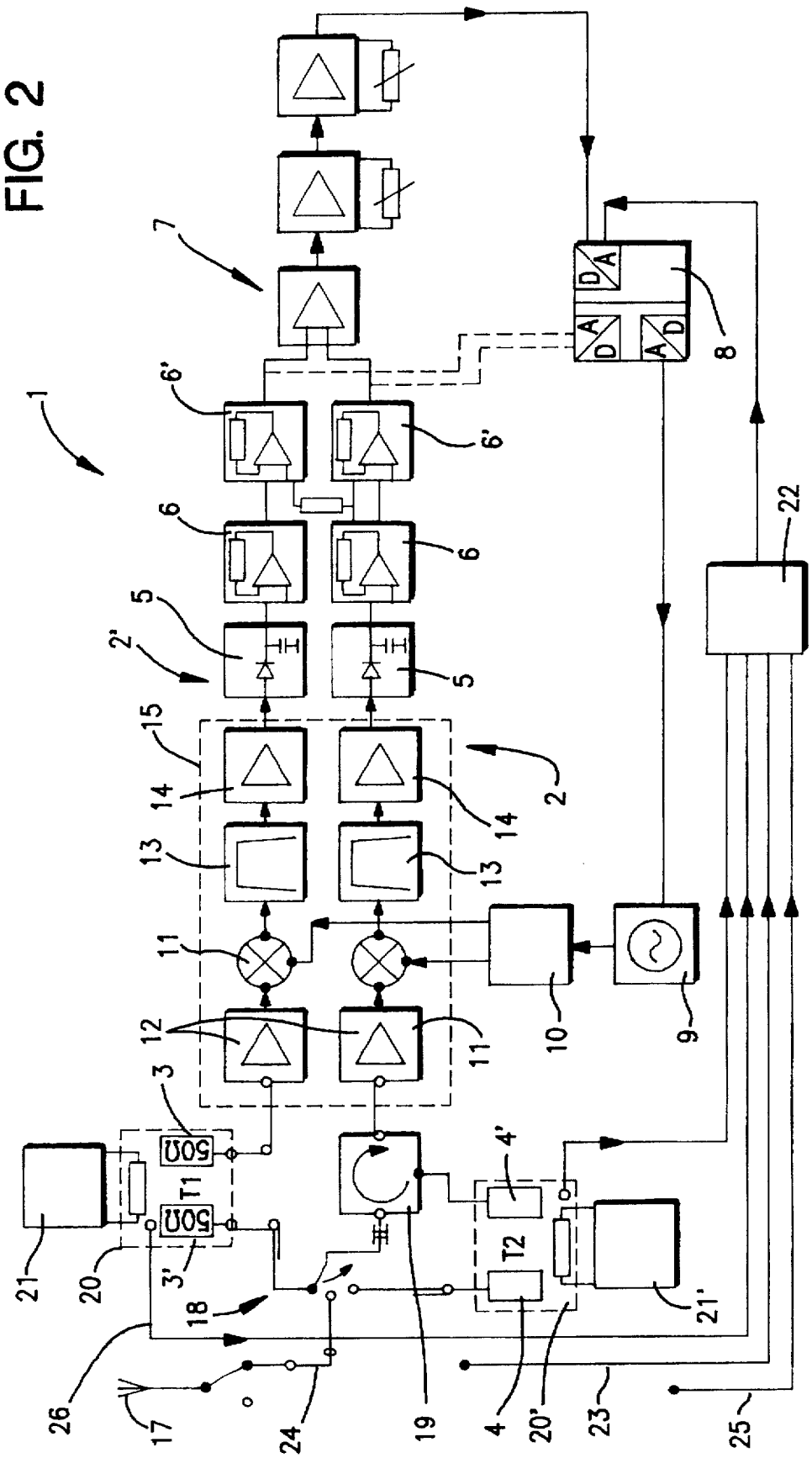
FIG. 2 is a synoptic diagram similar to that of FIG. 1 showing a modified embodiment of said radiometer.

According to the invention, and as shown in FIGS. 1 and 2 of the accompanying drawings, the radiometer is essentially constituted, on the one hand, by a double chain 1 for amplification of radiofrequency signals of thermal noises, whose two independent branches 2 and 2' are structurally symmetrical, one of said branches 2' measuring continuously a thermal noise signal generated by a predetermined reference source 3, on the other hand, by two identical converter circuit assemblies 5, 5', 6, 6' disposed each respectively in one of the two branches 2, 2' of the double radiometer amplification chain 1 and each delivering a continuous signal whose value is proportional to the value of the power of the thermal noise signal emitted by the associated branch 2 or 2', said continuous signals being transmitted, directly or after integration by a continuous differential amplification chain 7, to a control unit 8, for processing and evaluation, and finally by means 9, 10, 11 for changing the heterodyne frequency transposing in a lower frequency window, of the frequencies of the radiofrequency signals of thermal noise processed in the two branches 2 and 2' of the double radiometer amplification chain 1, the characteristics of said window for transposition of frequencies being determined by the control unit 8, for processing and evaluation, as a function particularly of any external interference signals.

The branch 2' and the assembly of consecutive converter circuits 5', 6' therefore process continuously a thermal noise signal from a reference source 3 and delivers a continuous analogic signal whose value can be compared continuously to the value of the corresponding continuous analogic signal representative of the thermal noise signal measured by the antenna 17, so as to determine the temperature of the body or of the portion of the body monitored by said antenna 17 on the basis of said comparison and of a regression curve established during the calibration phase of the radiometer.

According to a characteristic of the invention, shown in FIGS. 1 and 2 of the accompanying drawings, each branch 2, 2' of the double radiofrequency amplification chain 1 comprises successively a microwave amplifier 12 with a low noise factor and a high dynamic, a mixer 11 of radiofrequency signals ensuring the frequency transposition of the thermal noise signals, a pass-band filter 13 adapted to the window of frequency transposition, and a wide band aperiodic amplifier 14.

Moreover, each assembly of converter circuits can comprise preferably a quadratic detector 5, followed by one or several continuous amplifiers 6, 6' in cascade.

According to a preferred embodiment of the invention, the continuous amplifiers 6 and 6' in cascade, preferably two in number and forming a portion of the assemblies of converter circuits, and the continuous differential amplification chain 7, are grouped in the form of an instrumentation amplifier.

Such chain 7 could comprise a differential amplifier followed by amplifiers for the adjustment of the gain and the offset.

So as to limit as much as possible the risks of thermal derivatives and radioelectric and electromagnetic interference, which would require respectively a recalibration of the radiometer and the provision of a new set of measurements, because of a systematic error in the values measured, the double radiofrequency amplification chain 1 is enclosed in an electromagnetic shield 15, compartmented if desired, and is, as the case may be, disposed in a thermoregulated container or enclosure, as are also if desired the two converter circuit assemblies 5, 6, 6'.

The electromagnetic shielding 15 avoids any interaction, on the one hand, of a radiometer stage on the following or preceding and, on the other hand, of the double radiofrequency amplification chain 1 on the means for frequency change, and vice versa.

As also shown in FIGS. 1 and 2 of the accompanying drawings, the heterodyne frequency changing means are constituted, on the one hand, by an oscillator 9 which can be controlled as to frequency by the unit 8 for control, processing and evaluation or by a plurality of different fixed frequency oscillators which can be individually selected by said unit 8 for control, processing and evaluation, on the other hand by a power divider 10 and, finally, by two integrated radiofrequency mixers 11 each in one of the branches 2 or 2' of the double radiofrequency amplification chain 1.

These mixers can be of the active or passive type and the window of low frequencies can be situated in the vicinity of 500 MHz, the pass-band filter 13 having a passing band of about ±250 MHz and relatively abrupt slopes which determine the selectivity of the branches 2 and 2'.

The variable oscillator 9 could for example be in the form of an oscillator of the YIG, VCO or DRO type, controlled by the unit 8.

Preferably, the amplification circuits 14, 6, 6' and 7 situated downstream of the mixers 11 are of the aperiodic wide band type and have a very small undulation, so as to transmit an image of the thermal noise signals which will be as faithful as possible.

Moreover, each of the branches 2 and 2' of the double radiofrequency amplification chain has a gain of about 60 to 70 dB.

According to a first modification of embodiment of the invention, shown in FIG. 1 of the accompanying drawings, each input of the double radiofrequency amplification chain 1 is provided with a two-position selector 16, 16' permitting supplying, on the one hand, to one 2' of the branches 2, 2', selectively, the thermal noise signals emitted by a first 3 or by a second 4 reference source, corresponding to different temperatures and, on the other hand, to the other branch 2, selectively, the thermal noise signal delivered by a reference source 3' identical to the one 3 of those mentioned above, or the thermal noise signal supplied by a measuring antenna 17 applied to the body or to the portion of the body whose temperature must be determined.

According to a second modified embodiment of the invention, shown in FIG. 2 of the accompanying drawings, one 2 of the branches 2, 2' of the double radiofrequency amplification chain 1 is provided, at the level of its input, with a three-position selector 18 permitting applying to said branch 2 the thermal noise signal of a first reference source 3', the thermal noise signal of a second reference source 4, whose thermal noise corresponds to a different temperature than that of said reference source, or again the thermal noise signal supplied by a measuring antenna 17 applied to the body or to the portion of the body whose temperature must be determined, the input of the other branch 2' of said double radiofrequency amplification chain 1 being supplied continuously with a thermal noise signal delivered by a reference source 3 identical to the first reference source 3'.

So as to optimize the transfer of the signals between the antenna 17 and the corresponding processing branch 2 of the double amplification chain 1 , provision should preferably be made to provide the input of said branch 2 with an insulator 19 permitting effecting an impedance adjustment at the level of said input, the load of said insulator 19 being constituted by the resistance 4'.

So as to facilitate the determination of the absolute temperature of the body or of the portion of the body, corresponding to the thermal noise detected by the measuring antenna 17, and to increase precision, it is preferable that the thermal noise signals supplied by the two reference sources 3' and 4 correspond, one to a temperature lower than the minimum value of the range of temperatures expected for the body or the portion of the body to be measured and the other to a temperature higher than the maximum value of the range of temperatures anticipated for the body or the portion of the body to be measured.

Preferably, the lower reference temperature will be comprised between 30° C. and 35° C. and the upper reference temperature will be comprised between 50° C. and 55° C., which is to say located beyond the intended ranger without at the same time being spaced too far.

As shown in FIGS. 1 and 2 of the accompanying drawings, the reference sources 3, 3' and 4 of thermal noise signals can be in the form of resistive loads disposed in the respective enclosures 20, 20' heated to different reference temperatures and thermally regulated by means of a control device 21, 21' individual to each of said enclosures (loads 3 and 3' in the enclosure 20; load 4 in the enclosure 20').

The fourth resistive load 4' could be used as a load resistance for the insulator 19.

According to a modified embodiment of the invention; however, not shown in the accompanying drawings, the signal reference sources for thermal noise includes controlled avalanche diodes, whose temperatures and applied voltages are adjusted.

So as to be able to take account of the different derivative thermal factors which could as the case may be influence the operation of said radiometer and render false the determination of the value of the measured temperature, said radiometer could also comprise, as shown also in FIGS. 1 and 2 of the accompanying drawings, a unit 22 for control of temperature comprising particularly a temperature detector 23 disposed on or adjacent the connector cable 24 of the measuring antenna 17, a temperature detector 25 taking the temperature of the thermostatization water of a treatment device by microwave thermotherapy associated if desired with the radiometer, and at least two temperature detectors 26 and 26' taking the real temperatures of the enclosures 20, 20' or of the reference sources 3, 3' and 4 of the thermal noise signals, the different measurements taken by said control unit 22 being transmitted to the control unit 8, for processing and evaluation.

This latter, which can for example take the form of a station or a computer of known type under the designation "PC", of course includes various control programs and controls for the different phases of operation of said radiometers as well as a general control and communication program with a processing unit by microwave heating. Moreover, said unit 8 will thus comprise programming means, memorization means and editing means of the existing adjusted results.

The specific construction of the various components, circuits, units or the like of said radiometer are known per se to those skilled in the art and do not require further description.

The present invention also has for its object a process for measuring the temperature of a body, particularly a human body, or of a portion of a body, by means of detecting, acquiring and processing thermal noise signals, using the radiometer described above and consisting, in the measuring phase, in noting simultaneously and continuously the thermal noise signals delivered, on the one hand, by a radiometric antenna 17 applied to the body or to the portion of the mentioned body and, on the other hand, by a predetermined reference source 3, then in amplifying and transposing into the frequency range said two mentioned thermal noise signals, this by means of two treatment paths or branches 2 and 2' which are independent and identical, of a double radiofrequency amplification chain 1, in then extracting separately the continuous signals corresponding to the powers of each of said mentioned thermal noise signals, and, finally, in comparing the two continuous signals, analogically or digitally, to determine in real time the absolute value of the temperature of the body or of the portion of the mentioned body, by integrating different correction factors.

According to one characteristic of the invention, there is provided, before the measuring phase, the calibration of the two treatment paths 2 and 2' of the radiometer by applying to the inputs of said paths, alternately, thermal noise signals emitted by three reference sources 3, 3' and 4, of which two, 3 and 3', are identical, so as to be able to establish a linear regression curve for the determination of the absolute value of the temperature of the body or of the portion of the body to be analyzed, by comparison of the power of the thermal noise signal detected by the measuring antenna 17 with the power of the thermal noise signal emitted by one 3 of the three reference sources 3, 3' and 4.

The calibration of the radiometer comprising two selectors 16 and 16' of two positions (FIG. 1) can take place as follows: commutating the selector 16 on the output of the reference source 3' and of the selector 16' on the output of the reference source 3 (temperature identical to that of source 3'); detecting and memorizing the value of the differential voltage obtained (lower point of the regression and calibration path); commutating the selector 16' to the output of the reference source 4 (temperature higher than that of the source 3), the selector 16 remaining in its recited position; noting and memorizing the value of the obtained differential voltage (higher point of the regression and calibration course); commutating the selector 16 to the connector cable 24 of the measuring antenna 17 and beginning the measuring phase.

The calibration process is identical in the framework of the operation of the second modified embodiment of radiometer (FIG. 2), comprising a single three-position selector 18 and a branch 2' continuously connected to the reference source 3, said selector 18 being first commutated in a position corresponding to the outlet of the reference source 3' and, consecutively, in a position corresponding to the output of the reference source 4 (determination of the two end points of the regression course), then connected to the connector cable 24 of the measuring antenna 17.

So as to determine the frequencies or ranges of frequencies of the radiometric band which is the object of high power electromagnetic emissions, adapted to disturb the thermal noise signals, the process should consist, before the measuring phase, in scanning, by means of a change of heterodyne frequency permitting a transposition of the thermal noise signals in the frequency windows of variable measurement, the different frequency channels being adapted to be used by the radiometer and in raising the ranges or frequency channels inducing a significant difference in the final value measured by the radiometric antenna 17 relative to the predetermined reference sources 3, 3', 4, 3 and 3' being identical as the case may be, these frequency channels being excluded from the measurement and evaluation of the signals detected by the measuring antenna 17.

So as to be able also to avoid random disturbances, which are not susceptible of being first detected during the measuring phase, the process could also consist in detecting, during the measuring phase, the variations of the measured value corresponding to too-rapid rises or changes of temperature, relative particularly to the power dissipated in the body or the portion of the body by means for example of a treatment device by microwave thermotherapy, then in modifying the window of frequency transposition and in recalibrating the radiometer, these different steps being adapted to be taken automatically by the unit 8 for control, processing and evaluation.

According to a supplemental characteristic of the invention, the correction factors used consist in the attenuation of the different connection cables 24, the ambient temperature, the temperature of the liquid of a thermostatization device, surrounding if desired the measuring antenna 17 and the variations of temperature of the reference sources 3, 3', 4.

Given the electromagnetic shielding 15 and the thermoregulated enclosure surrounding particularly the double radiofrequency amplification chain 1, the derivative of said radiometer is small and recalibration is necessary only on the average two or three times in the course of a measuring sequence of about 45 minutes to 1 hour.

The different compensation parameters or correction factors are adjusted once for all time at the manufacturer by immersing the radiometric antenna 17 in vats of water brought to the limit temperatures corresponding to the two reference sources 3 and 4 of different temperature.

The connecting cables 24 supplying the different applicators or antennae 17 having constant length, no recalibration being necessary for this purpose.

However, in case of need, a new correction factor or a new value of an existing factor could be communicated to the unit 8 and memorized by this latter, for example in the case of a change in the measuring antenna 17 or applicator, the new value of the correction factor having been determined in the factory and indicated on said new applicator.

Of course, the invention is not limited to the embodiments described and shown in the accompanying drawings. Modifications remain possible, particularly as to the construction of various elements, or by substitution of technical equivalents, without thereby departing from the scope of protection of the invention.

We claim:

1. A radiometer for measuring thermal noise so as to determine the mean temperature of a body by means of a corresponding measuring antenna, the radiometer comprising a double amplification chain (1) of radiofrequency signals of thermal noises, having two structurally symmetrical independent branches (2 and 2'), one of said two branches (2') measuring continuously a thermal noise signal generated by a first reference source (3), and the other of said two branches for measuring a thermal noise signal from the measuring antenna;

two identical converter circuit assemblies (5, 5', 6, 6'), each disposed in one of said two branches (2, 2') and each delivering a continuous signal whose value is proportional to a power of the thermal noise signal emitted by its respective one of said two branches (2 or 2'), said continuous signals being transmitted to a control unit (8), for process and evaluation; and means (9, 1 0, 11) for changing a heterodyne frequency of the frequencies of the thermal noise signals processed in said two branches (2 and 2'), said heterodyne frequency being changed within a frequency transposition window of lower frequencies, the characteristics of said frequency transposition window being determined by the control unit (8) for process and evaluation, as a function of external interference signals.

2. The radiometer according to claim 1, wherein each of said two branches (2, 2') comprises a microwave amplifier (12) with a low noise factor and high dynamic, a radiofrequency signal mixer (11) ensuring the frequency transposition of the thermal noise signals, a pass-band filter (13) adapted to the frequency transposition window, and a wide band aperiodic amplifier (14).

3. The radiometer according to claim 1, wherein each of said two converter circuit assemblies comprises a quadratic detector (5), followed by at least one continous amplifier (6, 6') in cascade.

4. The radiometer according to claim 3, further comprising an instrumentation amplifier comprising said continuous amplifier and a continuous differential amplification chain (7).

5. The radiometer according to claim 1, further comprising an electromagnetic shielding (15).

6. The radiometer according to claim 1, wherein said means for changing heterodyne frequency comprises at least one oscillator (9) which can be controlled as to frequency by the control unit (8) for process and evaluation, a power divider (10); and two radiofrequency signal mixers (11) each integrated into one of said two branches (2 or 2').

7. The radiometer according to claim 1, further comprising a two-position selector (16') for applying to said one (2') of said two branches (2, 2') thermal noise signals from said first reference source (3) or from a second (4) reference source which correspond to different temperatures.

8. The radiometer according to claim 1, said other (2) of said two branches (2, 2') has at its input a three-position selector (18) permitting applying to said other branch (2) the thermal noise signal of a further reference source (3') identical to said first reference source (3), the thermal noise signal of a second reference source (4) whose thermal noise corresponds to a temperature different from that of said first reference source, or the thermal noise signal supplied by the measuring antenna (17).

9. The radiometer according to claim 8, wherein the thermal noise signals supplied by said further and second reference sources (3' and 4) each correspond to a different one of (a) temperature lower than the minimum value of the range of temperature expected for the body to be measured and (b) a temperature higher than the maximum value of the range of temperatures expected for the body to be measured.

10. The radiometer according to claim 8, wherein said further and second reference sources (3', 4) comprise resistive loads disposed in enclosures (20, 20') heated to different reference temperatures.

11. The radiometer according to claim 8, wherein said further and second reference sources comprise controlled avalanche diodes.

12. The radiometer according to claim 1, further comprising an insulator (19) for adjusting an impedance level of an input to said other of said two branches.

13. The radiometer according to claim 1, further comprising a unit (22) for temperature control comprising a temperature detector (23) adjacent a connection cable (24) of the measuring antenna (17), a temperature detector (25) for detecting the temperature of thermostating water of a device for microwave thermotherapy treatment associated with maid radiometer, and a temperature detector (26) for taking the temperature of said first reference source (3), the different measurements taken by said temperature control unit (22) being transmitted to the control unit (8) for process and evaluation.

14. The radiometer of claim 1, further comprising a two-position selector for applying to said other branch thermal noise signals from a further reference source identical to said first reference source or from the measuring antenna.

\* \* \* \* \*